Jan. 20, 1953   R. T. SCHUMANN   2,626,385
INDICATING INSTRUMENT
Filed July 12, 1950

INVENTOR.
Robert Thomas Schumann
BY
William F. Nickel
ATTORNEY.

Patented Jan. 20, 1953

2,626,385

UNITED STATES PATENT OFFICE 2,626,385

INDICATING INSTRUMENT

Robert Thomas Schumann, Brooklyn, N. Y.

Application July 12, 1950, Serial No. 173,390

7 Claims. (Cl. 340—239)

1

My invention is an improved testing apparatus; especially apparatus for testing excretory organs of the body, such as the kidneys, by measuring the rate of discharge of liquid therefrom.

An important object of the invention is to provide a testing apparatus that is certain in action and capable of indicating an unhealthy condition whenever the secretion drops below normal for a predetermined interval of time.

The operation of the apparatus is based upon the principle that the normal rate of output of urine from the kidneys, that is the volume to be expelled in a given time, is known and established. The measurement is made by storing the urine in a calibrated vessel during a selected period. If the quantity of urine deposited in the interval is too small an alarm will indicate that condition at the end of the interval. But if the required minimum quantity of urine is collected during the interval, the instrument will empty and reset itself at the end of the interval and will proceed automatically to measure the quantity obtained during succeeding intervals without actuating the alarm so long as normal functioning continues.

The drawings illustrate the preferred form of the apparatus and variations in structure and arrangement can be adapted without departing from the principle of the invention.

Figure 1:
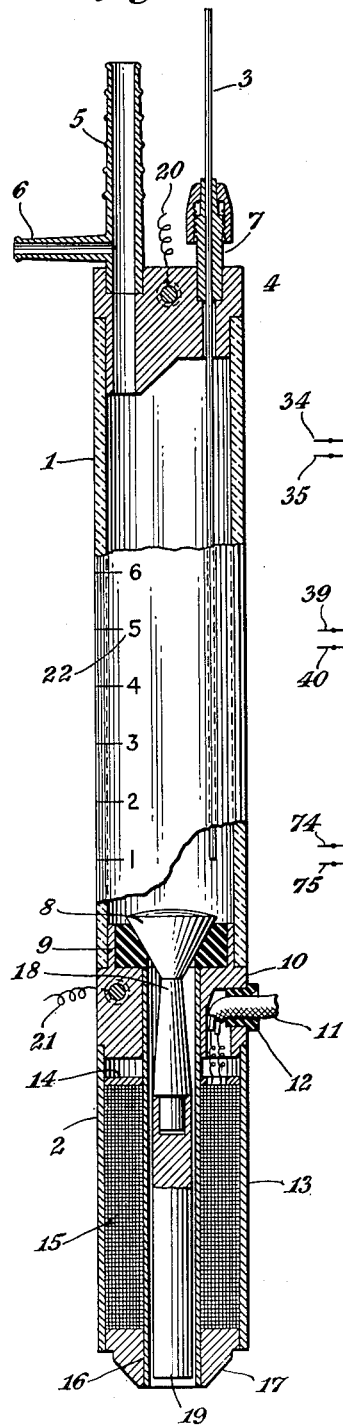
Figure 2:
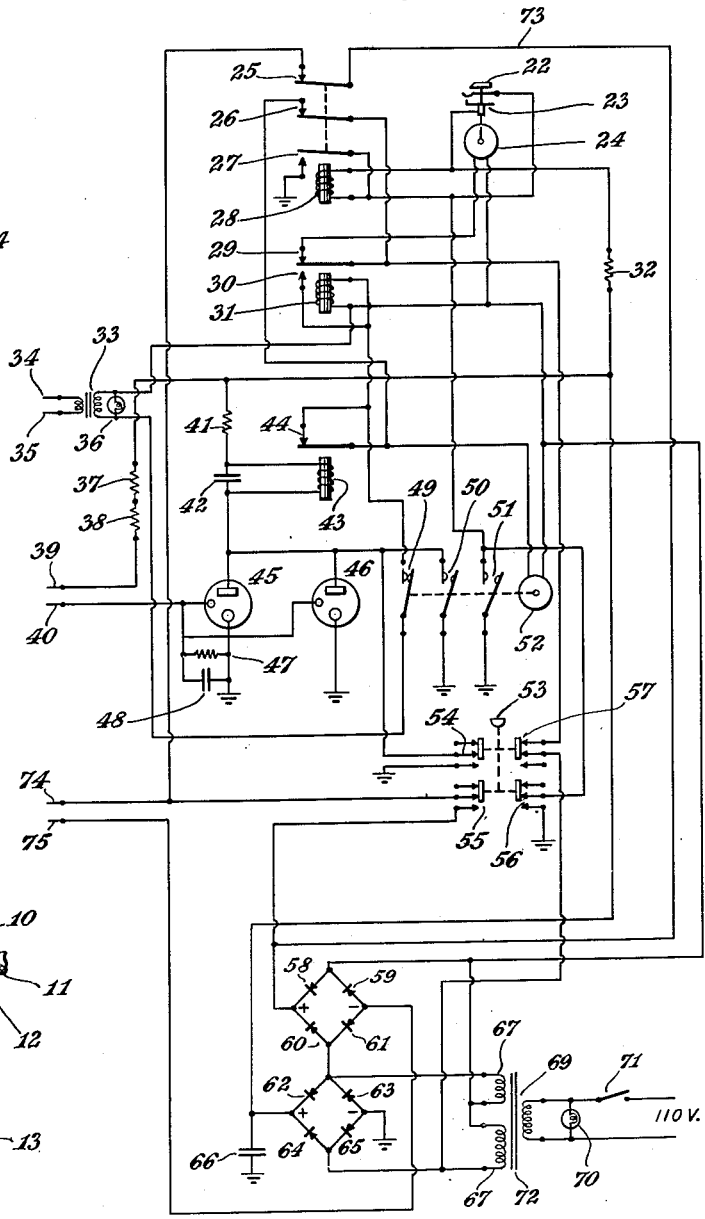

Figure 1 is a longitudinal section of the measuring of the measuring vessel; and Figure 2 is a plan of the controlling electric devices and circuits therefor.

The quantity of urine to be checked can be varied by adjusting the depth of penetration of a Monel metal wire rod 3, into the calibrated cylindrical receptacle 1. The setting of the rod 3 is maintained by friction of collet 7. This collet is made of any suitable material and engages the end of a perforated nipple on the vessel 1.

The urine is introduced into the measuring cylinder 1, through an inlet neck 5, which has an overflow outlet 6. In use a rubber tube is connected to the neck 5. At the bottom of the measuring vessel 1, is an electromagnetic valve 2 that is normally closed as a result of the combined weight of plunger 18 and plunger head or valve 8, causing the ground conical head 8 to fit upon the rubber seat 9. The plug 10, casing 13 and closure 17 for the lower end of the casing 13, are made of soft steel and provide a magnetic path to cause the magnetic flux produced by the electromagnet coil 15 in the casing 13 to exert an attracting force on steel plunger 18, united to the valve 8 to unseat the valve 8, with the result

2 that the valve opens to discharge the contents of the measuring vessel 1, through the outlet hole 19 in the closure 17. The cable 11 connects the magnet coil 15 to the actuating circuits in the main control unit through leads 74 and 75; being led out from the casing 13 through a waterproof bushing 12. The body 1 is non-conductive and the closure plug 4 at the top is metal. Leads 20 and 21 connect the plug 4, and the bottom electrode 10, through connections 39 and 40 respectively, to the detector tubes 45 and 46 remotely located in the main control unit. The cylinder 1 is calibrated in convenient units 22 to facilitate the adjustment of the quantity measuring electrode 3, which is in electrical contact with the plug 4.

The period during which the collected urine is to be measured is determined by the setting of the time selector knob 22, on the timer panel 73. This unit contains a two revolution per hour synchronous motor 24, which drives a rotating contact arm 23, through an electromagnetic clutch arrangement. The operating arm 27 of the clutch is connected to the armature of clutch coil 28. The instrument is put into operation by closing switch 71. The indicating lamp 70 serves to show that power is on when switch 71 is closed. A transformer 69 supplies power at the proper potentials to the various circuits. Rectifiers 58, 59, 60 and 61 supply direct current for actuation of the valve electromagnet coil 15. Rectifiers 62, 63, 64 and 65 in conjunction with capacitor 66 supply direct current to the detector and timer circuits.

To reset all circuits and start the operational cycle the manual starting switch 53 is depressed. This operation causes sections 54, 55 and 56, to close while section 57 opens. Section 54 resets the detector tubes 45 and 46, by short circuiting the plate circuit of these tubes to ground. Through the terminals of section 55 power is now supplied to the valve electromagnet coil 15, to open valve 8 and allow its contents to discharge through the outlet 19 at any desired instant. Also through the terminals of the section 56 power is supplied to energize the clutch magnet coil 28 to attract the armature 27 to its pole piece and engage the clutch to cause the synchronous motor 24, to drive the rotating contact arm 23. Simultaneously through the contacts at 27 a holding circuit is closed which continues to keep the coil 28 energized during the interval of time for which the device is adjusted. The terminals 25 and 26 are held open during this period so that the valve 8 and the valve energizing timing motor 52 circuits respectively, will be inoperative. Section 57 of the switch 53 serves to reset the alarm actuating circuit, by cutting off the power to relay coil 31, thus allowing its armature to be pulled away and opening contacts 30, thereby breaking the alarm holding circuit. At the same time contacts 29 close, to supply power to the timer motor 24. Now that the motor 24 is energized, it drives the rotating contact arm 23, through the clutch mechanism, until it makes contact with the adjustable time contact arm 22. This action occurs at the end of the predetermined time interval. The result of the two contacts meeting is that they short circuit the clutch magnet coil 28 and cause the current flow through the coil to cease. When this happens the magnetic field collapses allowing the armature to be pulled away from the pole piece, which disengages the clutch driving mechanism and allows the rotating contact arm 23 to return to zero time position by virtue of a spring. At the same time contacts 27 open breaking the clutch holding circuit, while contacts 25 and 26 close.

Through contacts 25 power is supplied to the coil 15 and the resultant magnetic flux pulls the plunger 18 upward, lifting the plunger head 8 off the rubber valve seat 9 and thus allowing the urine to discharge from the measuring cylinder 1, through the valve outlet hole 19. By way of contacts 26 power is supplied to the timing motor 24, which fixes the period the valve 8 is to remain open. This motor 24 is a one revolution per minute synchronous motor driving a timer 52, that actuates micro-switches 49, 50 and 51, through an automatic resetting arrangement contained in the motor 52, which becomes operative when the power to the motor 52 is interrupted. A cam actuates the closure of the switches in a precise time sequence pattern. Switches 49, 50 and 51 close at the thirteenth, fourteenth and fifteenth second respectively, after the motor 52 has been energized.

Switch 49 in conjunction with relay 43 controls the alarm circuit.

Switch 50 resets the detector tube at the end of the valve energizing period.

Switch 51 is the automatic interval starting switch.

The functioning of the apparatus can best be described under the two following conditions:

(1) When the predetermined quantity of urine has been accumulated during the selected time interval.

(2) When the predetermined quantity of urine has not been accumulated during the selected time interval.

Condition 1 will be described first.

*Quantitive detection and valve actuation*

At the beginning of the cycle the valve 8 is closed, allowing the urine to collect in the measuring cylinder 1. Located at the top and bottom of the cylinder 1 are the electrodes 4 and 10 which connect to the detector tubes 45 and 46, remotely located in the main control unit. Lead 39 connects the lead 20 and lead 41 to lead 21. When the urine flows into the cylinder 1 it comes into contact with the bottom electrode 10. As more and more flows into the cylinder 1 the level of the urine rises until it touches the rod 3. When this occurs a minute current flows through resistor 47 to the bottom electrode 10, through the urine to the rod 3, to the top electrode 4 and from there through resistors 38 and 37 to the positive return of the power supply. The flow of current through resistor 47 produces a positive voltage at the grid of the detector tubes 45 and 46, causing one of the two, to conduct. The resultant flow of current through the tube and relay 43, in series with the tube, causes the armature of the relay to be attracted to the pole piece thereby separating contacts 44 and interrupting the alarm circuit to the A. C. power supply. At the end of the predetermined interval, the clutch coil 28 is de-energized which causes the following events to take place.

(1) The magnetic field of the clutch coil 28 collapses allowing the armature to be pulled away from the pole piece, which disengages the clutch driving mechanism and allows the rotating contact arm 23 to return to zero time position by virtue of a spring and at the same time open contacts 27 breaking the clutch coil holding circuit, while contacts 25 and 26 close.

(2) Through contacts 25 power is supplied to the valve, electromagnet coil 15 and the resultant magnetic flux pulls plunger 18 upward, lifting plunger head 8 off the rubber valve seat 9, and allowing the urine to discharge from the measuring cylinder 1 through the valve outlet hole 19.

(3) Through contacts 26 power is supplied to the timing motor 52, which determines the period the valve 8 is to remain open. Thirteen seconds later switch 49 closes but is prevented from completing the alarm circuit because contacts 44 on relay 43 are open because the predetermined quantity of urine has been collected in the measuring cylinder 1. At the fourteenth second switch 50 closes, short circuiting the detector tubes 45 and 46 to ground. This causes the current flow through the ignited tube to cease and in so doing extinguishes the conducting tube. Relay 43 remains closed although the tube is extinguished because switch 50 carries the current to ground. At the fifteenth second, switch 51 closes energizing the clutch magnet coil 28, and then the following actions take place:

(a) The magnetic field created by the current flowing through the clutch magnet coil 28 attracts the armature to its pole piece and engages the clutch which allows the synchronous motor 24 to drive the rotating contact arm 23. At the same time contacts 27 close and make up a holding circuit which continues to hold the coil 28 energized during the next time interval period.

(b) Contacts 25 open breaking the current flow to the coil 15 with the result the magnetic field collapses and the valve reseats itself on the rubber valve seat 9 so that the urine may be collected in the measuring cylinder 1 during the next interval.

(c) Contacts 26 open to cut off power to the motor 52, thus allowing it to reset. In resetting switches 51, 50 and 49 are opened in the order described.

(d) Switch 51 opens breaking energizing circuit of the coil 28.

(e) Switch 50 opens, breaking the reset circuit to the detector tubes. Relay 43 will close contacts 44 in about one second, after switch 50 opens, due to the stored energy in capacitor 42 being dissipated in the magnetic field of the relay 43.

(f) Switch 49 opens breaking the alarm circuit before contacts 44 on relay 43 can close, which were it to happen, would energize the alarm circuit at the wrong time.

The apparatus will now proceed to collect the minimum quantity of urine from the subject's kidneys during the next interval. If the required minimum amount of urine is collected during the next interval the instrument will reset at the end of the interval and will proceed automatically to measure the collected quantity during successive intervals without sounding the alarm, as long as the required minimum quantity of urine is collected, during the predetermined time interval period.

*Condition two*

When the quantity of urine collected during the time interval does not equal the minimum quantity selected the fluid level will not rise high enough in the measuring cylinder 1 to contact the electrode 3; consequently, there can be no flow of current through the electrodes 10, 3 and 4 to ignite one of the detector tubes, 45 or 46. Since there is no flow of current through the detector tube 45 or 46 and consequently through relay 43, the armature of the relay will remain in the open position away from the pole piece. In this position the alarm circuit contacts 44 are closed and the alarm circuit is ready to be energized after the termination of the predetermined time interval, when switch 49 closes thirteen seconds after the timing motor 52 is energized.

The operation of the alarm actuating circuit is as the following description.

Upon termination of the predetermined time interval the following events take place.

(1) The magnetic field of the clutch coil 28 collapses allowing the armature to be pulled away from the pole piece, which disengages the clutch driving mechanism and allows the rotating contact arm 23 to return to zero time position by virtue of a spring and at same time open contacts 27, breaking the clutch coil 28 holding circuit, while contacts 25 and 26 close.

(2) Through contacts 25 current flows to the valve electromagnet coil 15 and the resultant magnetic flux pulls plunger 18 upward, lifting valve head 8 off the rubber valve seat 9, and allowing the urine to discharge from the measuring cylinder 1 through the valve outlet hole 19.

(3) Through contacts 26 current flows to the timing motor 52 which fixes the period the valve 8 is to remain open. Power is also supplied through closed contacts 44 to relay coil 31. The resulting magnetic field there attracts its armature to the pole piece and in so doing opens contacts 29, breaking the power connection to the motor 24, so that it is rendered inoperative until the manual switch 53 is actuated to reset and start the instrument again. Contacts 30 close at the same time to supply power to the relay's coil 31 to make up the alarm holding circuit.

(4) Thirteen seconds later switch 49 closes, completing the alarm circuit through the closed contacts 44 and the alarm gong transformer 33 primary to the A. C. power supply. The secondary connects to the alarm gong through leads 34 and 35. Connected across the primary is an indicator lamp 36 which flashes on when switch 49 closes.

(5) At the fourteenth second switch 50 closes, short circuiting the detector tubes 45 and 46 to ground. This causes current to flow through switch 50, relay coil 43 and resistor 41 to the high voltage power supply. The flow of current through the coil 43 produces a magnetic field which attracts the armature to the pole piece, with the result contacts 44 are separated, breaking the alarm circuit power connection to the timing motor 52. The motor 52 continues to drive switches 49, 50 and 51, however, because contacts 26 on the clutch magnet are closed and supply power to the motor 52.

(6) At the fifteenth second switch 51 closes energizing the clutch magnet coil 28 which causes the following events to take place.

(a) The magnetic field created by the current flowing through the clutch magnet coil 28 attracts the armature to its pole piece and engages the clutch. Then the synchronous motor 24 drives the rotating contact arm 23. The motor 24 cannot drive the contact arm 23 because relay 31 is energized, during the alarm cycle (see paragraph 3) with the result contacts 29 are open, breaking the power connection to the motor 24. At the time the clutch is engaged, contacts 27 close and make a holding circuit which keeps the clutch coil 28 energized during the alarm cycle.

(b) Contacts 25 open breaking the current flow to the electromagnet coil 15 with the result the magnet field collapses and the plunger head 8 reseats itself on the rubber valve seat 9 thereby closing the valve 2.

(c) Contacts 26 open to break the circuit to the timing motor 52. Since the only other current path to the motor 52 also is broken (through contacts 44 on relay 43 to contacts 30 on relay 31 to the A. C. power supply) the motor mechanism starts to reset by virtue of a spring. As the mechanism resets the switches are opened in the reverse order of closure, namely, 51, 50 and 49.

(d) Switch 51 opens breaking the clutch coil 28 energizing circuit.

(e) Switch 50 opens interrupting the flow of current through relay coil 43. Contacts 44 remain closed however, because of the energy stored in capacitor 42 maintaining the flow of current through the coil 43 at sufficient strength to hold the relay closed for about one second after switch 50 opens.

(f) Switch 49 opens interrupting the power to the alarm transformer 33 primary and thus causing the alarm to sound.

(g) As the stored energy in capacitor 42 falls to zero the armature of relay 43 is pulled away from its pole piece by a spring with the result contacts 44 close, supplying power to the timing motor 52.

(h) The motor 52 starts driving again and closes switch 49, supplying power to the alarm transformer 33 primary causing the alarm to sound and the indicating lamp 36 to flash on.

(i) Switch 50 closes, causing current to flow through relay coil 43 with the result the armature is attracted to the pole piece, separating contacts 44 and thereby interrupting the power to the timing motor 52, causing it to reset.

The operation from here on repeats itself starting at point (e) of the preceding cycle until it reaches point (i) whereupon it reverts back to point (e) and keeps repeating this alarm sounding cycle over and over again until the manual starting switch 53 is actuated to reset all circuits.

Having described my invention, what I believe to be new is:

1. A container for liquid having an inlet at the top and an outlet at the bottom, a normally closed valve for said outlet, an electrically conductive member adjacent said valve, an adjustable conductor rod extending into said container above said outlet, said rod and said member being insulated from each other, electrical conductors attached to said rod and said member, a magnet coil adjacent said valve, said coil when energized being arranged to open the valve, settable timing means for energizing the coil to open the valve after a given time interval, said timing means also having means operated thereby for preparing an alarm circuit a predetermined time interval after it causes the operation of the valve and means included in a circuit comprising the conductors connected to said rod and said member for preventing the completion of the alarm circuit in the event that the level of the liquid in the container reaches the rod during the first mentioned interval.

2. A container for liquid having an inlet at the top and an outlet at the bottom, a normally closed valve having a metallic stem for said outlet, an electrically conductive member adjacent said valve, an adjustable metallic rod extending into said vessel above said outlet with its inner end a selected distance from said valve, an electrically conductive member adjacent said valve and insulated from said rod, a magnet coil adjacent said stem, electrical conductors in circuit with said rod and said member and electrical means attached to said coil to open the valve to energize the coil said electrical means comprising a circuit having an adjustable device to cause the coil to open the valve after a predetermined time interval and means operated by the adjustable device for preparing an alarm circuit a predetermined time interval after the opening of the valve, and a circuit comprising the conductors for said rod and member for preventing completion of the alarm circuit when the level of the liquid in the container reaches the rod during the first mentioned time interval.

3. A container for liquid comprising a vessel having an inlet at the top and an outlet at the bottom, an adjustable normally closed valve for said outlet, a conductor rod in said vessel, disposed at a selected distance from the valve, a conductor member adjacent said outlet, a seat of insulation for the valve on said member, the valve being exposed to the interior of the vessel, a coil adjacent the valve, conductors in circuit with said rod and said member, said coil when energized being arranged to open the valve, a circuit connected to said coil and including settable timing means for energizing the coil to open the valve after a given time interval, said timing means also having means operated thereby for preparing an alarm circuit a predetermined time interval after it causes the operation of the valve and means included in a circuit comprising the conductors connected to said rod and said member for preventing the completion of the alarm circuit in the event that the level of the liquid in the container reaches the rod during the first mentioned interval.

4. Measuring apparatus comprising a vessel for liquid having an inlet at the top and an outlet at the bottom, a normally closed valve for said outlet, an adjustable conductor rod in said vessel disposed a selected distance from said valve, a conductor member adjacent the outlet, a stem for the valve projecting from the vessel, a coil surrounding said stem, a casing for the coil attached to said vessel and surrounding said stem, a discharge duct passing through the coil and surrounding said stem, conductors in circuit with said rod said coil when energized being arranged to open the valve, a circuit connected to said coil and including settable timing means for energizing the coil to open the valve after a given time interval, said timing means also having means operated thereby for preparing an alarm circuit a predetermined time interval after it causes the operation of the valve and means included in a circuit comprising the conductors connected to said rod and said member for preventing the completion of the alarm circuit in the event that the level of the liquid in the container reaches the rod during the first mentioned interval.

5. A container for liquid comprising a vessel having an inlet at the top and an outlet at the bottom, a normally closed valve for the outlet, a conductor member adjacent the outlet, a seat of insulation for the valve on said member, the valve being exposed to the interior of the vessel, the valve having a magnetic stem projecting from the vessel, an adjustable conductor rod extending into the vessel disposed at a selected distance from the valve, a coil surrounding the stem, a casing for the coil attached to said vessel, conductors in circuit with the member and the rod, conductors joined to said coil, said coil when energized being arranged to open the valve, a circuit connected to said coil and including settable timing means for energizing the coil to open the valve after a given time interval, said timing means also having means operated thereby for preparing an alarm circuit a predetermined time interval after it causes the operation of the valve and means included in a circuit comprising the conductors connected to said rod and said member for preventing the completion of the alarm circuit in the event that the level of the liquid in the container reaches the rod during the first mentioned interval.

6. A container for liquid comprising a vessel of insulating material having an inlet at the top and an outlet at the bottom, a normally closed valve for the outlet, a metallic plug at the upper end of said vessel, an adjustable metal rod adjustably mounted in the plug and extending towards said valve, a metal plug closing the lower end of said vessel, said plug carrying a rubber seat for the valve, a casing attached to said member, a magnet coil in the casing, the valve having a stem extending into the casing, a discharge duct in the casing surrounding said stem and connected to said outlet, electric conductors connected to said coil, and electric conductors in circuit with said rod and said plug, said coil when energized being arranged to open the valve, a circuit having settable timing means for energizing the coil to open the valve after a given time interval, said circuit including the timing means also having means operated thereby for preparing an alarm circuit a predetermined interval after it causes the operation of the valve and means included in a circuit comprising the conductors connected to said rod and said plug for preventing the completion of the alarm circuit in the event that the level of the liquid in the container reaches the rod during the first mentioned interval.

7. A container for liquid comprising a vessel of insulating material having a metallic closure at its upper end, and an inlet at said end, a metallic closure for its lower end, said last-named closure carrying a valve seat of insulating material, the seat and closure having an outlet opening, a normally closed valve for said opening, a metallic rod adjustably mounted in the first-named closure extending into the vessel towards said valve, a casing attached to the vessel adjacent said valve, a magnet coil in the casing, a discharge duct in the casing surrounded by the coil and connected to the outlet, a stem on the valve in said duct, conductors in circuit with said rod and the second-named closure, conductors connected to the coil, and means in circuit with said coil when energized being arranged to open the valve, a circuit having settable timing means for energizing the coil to open the valve after a given time interval, said circuit including the timing means also having means operated thereby for preparing an alarm circuit a predetermined time interval after it causes the operation of the valve and means included in a circuit comprising the conductors connected to said rod and said second-named closure for preventing the completion of the alarm circuit in the event that the level of the liquid in the container reaches the rod during the first mentioned interval.

ROBERT THOMAS SCHUMANN.

REFERENCES CITED

The following references are of record in the file of this patent:

UNITED STATES PATENTS

| Number | Name | Date |
| --- | --- | --- |
| 2,202,197 | Ewertz | May 28, 1940 |
| 2,325,695 | McAfee | Aug. 3, 1943 |
| 2,385,161 | Pinkerton | Sept. 18, 1945 |
| 2,505,905 | McAfee | May 2, 1950 |

FOREIGN PATENTS

| Number | Country | Date |
| --- | --- | --- |
| 15,514 | Great Britain | of 1903 |
| 582,155 | Great Britain | Nov. 6, 1946 |